US009581136B2

(12) United States Patent
Pasquet et al.

(10) Patent No.: US 9,581,136 B2
(45) Date of Patent: Feb. 28, 2017

(54) WIND TURBINE ROTOR

(71) Applicant: ALSTOM RENOVABLES ESPAÑA, S.L., Barcelona (ES)

(72) Inventors: Pierre Pasquet, Alella (ES); Santiago Canedo Pardo, Barcelona (ES)

(73) Assignee: Alstom Renovables España, S.L., Barcelona (ES)

( * ) Notice: Subject to any disclaimer, the term of this patent is extended or adjusted under 35 U.S.C. 154(b) by 518 days.

(21) Appl. No.: 14/345,636

(22) PCT Filed: Sep. 28, 2012

(86) PCT No.: PCT/EP2012/069235
§ 371 (c)(1),
(2) Date: Mar. 18, 2014

(87) PCT Pub. No.: WO2013/045644
PCT Pub. Date: Apr. 4, 2013

(65) Prior Publication Data
US 2014/0341740 A1 Nov. 20, 2014

Related U.S. Application Data

(60) Provisional application No. 61/565,242, filed on Nov. 30, 2011.

(30) Foreign Application Priority Data

Sep. 30, 2011 (EP) .................... 11382307

(51) Int. Cl.
F03D 7/02 (2006.01)
F03D 7/04 (2006.01)

(52) U.S. Cl.
CPC ............ F03D 7/0224 (2013.01); F03D 7/04 (2013.01); F03D 15/00 (2016.05); F03D 80/00 (2016.05);
(Continued)

(58) Field of Classification Search
CPC .......... F03D 7/0224; F03D 7/04; F03D 80/00; F03D 80/70; F03D 15/00; Y02E 10/722; Y02E 10/723
See application file for complete search history.

(56) References Cited

U.S. PATENT DOCUMENTS 8,696,314 B2 * 4/2014 Mashue ................ F03D 7/0224
416/170 R
9,091,247 B2 * 7/2015 Torcelli ................ F03D 7/0224
(Continued)

FOREIGN PATENT DOCUMENTS

DE 202005014699 U 12/2005
EP 1 596 064 A2 11/2005
(Continued)

OTHER PUBLICATIONS

International Search Report for PCT/EP2012/069235, mailed Apr. 17, 2013, 10 pgs.

Primary Examiner — Mary McManmon
Assistant Examiner — Daphne M Barry
(74) Attorney, Agent, or Firm — Dority & Manning, P.A.

(57) ABSTRACT

Wind turbine rotor comprising a hub, a plurality of blades and at least one pitch system for rotating a blade substantially along its longitudinal axis. The pitch system comprises a bearing, a gear and a pitch drive. The pitch drive is arranged on a flange and has a motor and a pinion which meshes with the gear. The flange is provided with a hole and an intermediate support is concentrically arranged with respect to the hole. The intermediate support comprises an off-center opening with respect to a central axis of the hole and the pitch drive is mounted through said off-center opening. The position of the off-center opening is such that the intermediate support can be arranged in a first and a
(Continued)

second position in which the drive pinion meshes with a first and second section of the gear respectively.

19 Claims, 3 Drawing Sheets

(52) U.S. Cl.
CPC ............ *F03D 80/70* (2016.05); *Y02E 10/722* (2013.01); *Y02E 10/723* (2013.01)

(56) References Cited

U.S. PATENT DOCUMENTS

| | | | |
|---|---|---|---|
| 2008/0191488 A1* | 8/2008 | Kirchner ............... | F03D 1/0658 290/55 |
| 2010/0135808 A1* | 6/2010 | Wiebrock ............. | F03D 7/0224 416/155 |
| 2013/0243599 A1* | 9/2013 | Pasquet ................. | F03D 7/0224 416/147 |
| 2014/0112790 A1* | 4/2014 | Noirot ................... | F16C 33/581 416/147 |
| 2015/0377218 A1* | 12/2015 | Trede ...................... | F03D 1/001 416/1 |

FOREIGN PATENT DOCUMENTS

| EP | 1816346 | 8/2007 |
|---|---|---|
| WO | WO 2008/074320 | 6/2008 |
| WO | WO 2010/045914 | 4/2010 |

* cited by examiner

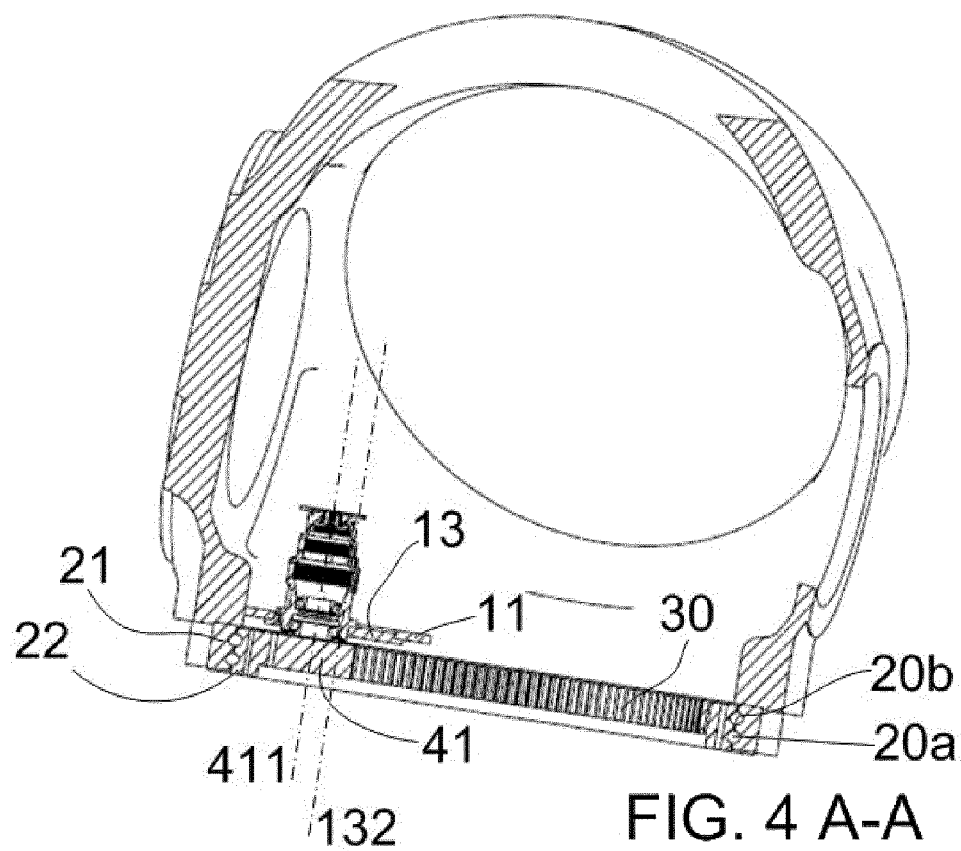
FIG. 4 A-A
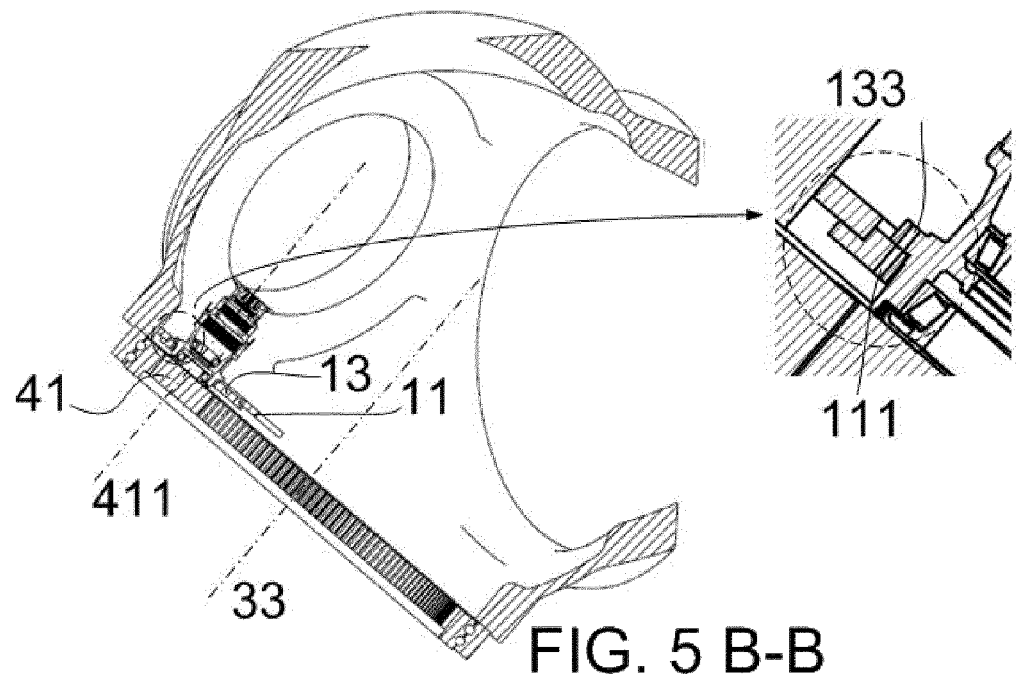
FIG. 5 B-B

WIND TURBINE ROTOR

This application claims the benefit of European Patent Application 11382307.4 filed Sep. 30, 2011 and U.S. Provisional Patent Application Ser. No. 61/565,242 filed Nov. 30, 2011.

The present disclosure relates to wind turbine rotors, and more particularly relates to wind turbine rotors comprising at least one electromechanical pitch mechanism.

BACKGROUND ART

Modern wind turbines are commonly used to supply electricity into the electrical grid. Wind turbines generally comprise a rotor with a rotor hub and a plurality of blades. The rotor is set into rotation under the influence of the wind on the blades. The rotation of the rotor shaft drives the generator rotor either directly ("directly driven") or through the use of a gearbox.

Pitch systems may be employed for adapting the position of a wind turbine blade to varying wind conditions. In this respect, it is known to rotate the position of a wind turbine blade along its longitudinal axis in such a way that it generates less lift (and drag) when the wind speed increases. In this way, even though the wind speed increases, the torque transmitted by the rotor to the generator remains substantially the same. It is furthermore also known to rotate wind turbine blades towards their stall position (so as to reduce the lift on the blades) when the wind speed increases. These wind turbines are sometimes referred to as "active-stall" wind turbines. Pitching may furthermore also be used for rotation of the blades towards their vane position, when a turbine is temporarily stopped or taken out of operation for e.g. maintenance.

Pitch systems generally comprise an electric or hydraulic motor which, through the use of reduction gearing (sometimes referred to as a "reductor", or as a "reduction gear"), drives an actuating gear. Said actuating gear (pinion) is generally arranged to mesh with an annular gear provided on the wind turbine blade to set the wind turbine blade into rotation. Other actuating mechanisms operated by a pitch motor are also known.

It is further known to provide an individual pitch system (comprising a separate motor and separate control) for each individual wind turbine blade of a rotor. It is also known to provide a common pitch system wherein the pitch angle of the blades is the same for all blades on a rotor. Such a common pitch system may comprise a single motor or may comprise a plurality of motors, one for each blade.

A control strategy of a pitch system that is often employed in variable speed wind turbines is to maintain the blade in a default pitch position at wind speeds equal to or below nominal wind speed (for example, approximately 4 m/s-15 m/s). Said default pitch position may generally be close to a 0° pitch angle. The exact pitch angle in or below nominal wind speed conditions depends however on the complete design of the wind turbine. Above the nominal wind speed (for example from approximately 15 m/s-25 m/s), the blades are rotated to maintain the aerodynamic torque delivered by the rotor substantially constant. When the wind turbine is not operating, the blades may assume a vane position (e.g. at or around 90° pitch angle) to minimize the loads on the blades. During most of the wind turbine's life, a blade may however be in the same pitch position which is that at or below nominal wind speed. The nominal wind speed, cut-in wind speed and cut-out wind speed may of course vary depending on the wind turbine design.

During operation of the wind turbine, forces may be acting on the blades that result in a constantly varying torque around the blade's longitudinal axis. These forces may include the aerodynamic torque around the longitudinal axis of the blade. Furthermore, since the blade's centre of mass is usually not located exactly on its rotating axis, the weight of the blade may exercise an additional torque around the blade's longitudinal axis. Both these forces are non-constant, largely cyclical and tend to rotate the blade out of the position determined by the pitch control system.

When a pitch system involving gearing is used, the varying torque may result in flanks of the teeth of the actuating gear (pinion) and annular gear repeatedly touching each other. Such repetitive contact between teeth may remove thin metallic particles, and may create a tooth print in the contacting flanks of the gear and the pinion. This repetitive contact may thus lead to fretting corrosion and premature wear. Since the pitch position at or below nominal wind speed is the prevailing position for most wind turbines, the contact between the teeth and its consequences is usually concentrated on the same teeth.

Some solutions for these problems are known. It is e.g. known to provide an automatic lubrication system to try and prevent fretting corrosion. For example, DE202005014699U and EP1816346 provide such lubrication systems. These lubrication systems may help to reduce fretting corrosion to a smaller or larger extent, but do not combat or resolve the problem underlying the corrosion, namely the teeth flanks contacting each other. Further, once the teeth contacting the pinion are damaged, the whole annular gear needs to be replaced.

Document WO2010045914 describes a movable pitch drive system comprising a guiding means for displacing a rotor blade adjustment device between two positions in which cooperation between the pinion and the annular gear is possible. Such mechanisms offer at least a couple of possible pitch locations wherein the drive pinion may mesh with the annular gear, thus retarding the replacement of the whole annular gear. However the machining of such guiding means may at least partly compromise the robustness and resistance of the console for mounting the pinion.

There still exists a need to achieve robust electromechanical pitch drive system which can easily extend the life of particularly the annular gear and is also cost-effective.

SUMMARY

In a first aspect, a wind turbine rotor comprising a hub, a plurality of blades and at least one pitch system for rotating a blade substantially along its longitudinal axis is provided. The pitch system comprises a bearing, a gear and a pitch drive. The pitch drive is arranged on a flange and has a motor and a pinion which meshes with the gear, wherein one of the hub and blade comprises said flange and the other of the hub and blade comprises said gear. The flange is provided with a hole and an intermediate support is concentrically arranged with respect to the hole, wherein the intermediate support comprises an off-center opening with respect to a central axis of the hole and the pitch drive is mounted through said off-center opening, and wherein the position of the off-center opening is such that the intermediate support can be arranged in a first position in which the drive pinion meshes with a first section of the gear and in a second position in which the drive pinion meshes with a second section of the gear.

According to this aspect, the drive pinion is mounted off-centered with respect to the intermediate support and the hole. The off-centric opening in the intermediate support, on which the drive pinion is mounted, defines two different positions of the intermediate support in which the drive pinion can mesh with the gear. If the teeth of the gear and the pinion contacting each other get damaged (for example when the blade is in a pitch position for nominal or below wind speeds), a simple operation of moving the intermediate support from a first position in which the drive pinion can mesh with a first gear section to a second position in which the drive pinion can mesh with a second gear section results in new teeth of the pinion contacting new teeth of the gear. This way, in the pitch position for wind speeds at or below nominal wind speed, other teeth of the gear are in contact with the pinion. The life of the gear may thus be extended with a relatively simple operation.

Further, the robustness and stiffness of the assembly flange-intermediate support is not affected by the presence of a hole. Also, above described construction does not hinder or negatively influence the normal operation of a pitch system.

In some embodiments, the intermediate support may be fixed to the flange by screws or bolts being arranged around a perimeter of the intermediate support. This ensures that the intermediate support and flange may be easily assembled and disassembled and thus the intermediate support may be easily moved between the different positions in which the pinion can mesh with the gear.

In some embodiments, the screws or bolts fixing the intermediate support to the flange may be arranged in predefined screw or bolt positions such that the intermediate support can be fixed only in the first and second positions in which the drive pinion meshes with the first and second gear sections respectively. This may simplify the operation of changing the position of the intermediate support as it avoids taking measurements while moving the intermediate support and/or avoids missing the correct position.

In some embodiments, the drive pinion may be mounted on a reductor gearing of the pitch system, the reductor may be fixed to the intermediate support by screws or bolts. This ensures an easy replacement of the drive pinion if required.

Another aspect provides a wind turbine comprising a wind turbine rotor substantially as hereinbefore described.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which:

FIG. 4 shows a cross-sectional view along line A-A of FIG. 3a; and

FIG. 5 shows a cross-sectional view along line B-B of FIG. 3a.

DETAILED DESCRIPTION OF EMBODIMENTS

Figure 1:
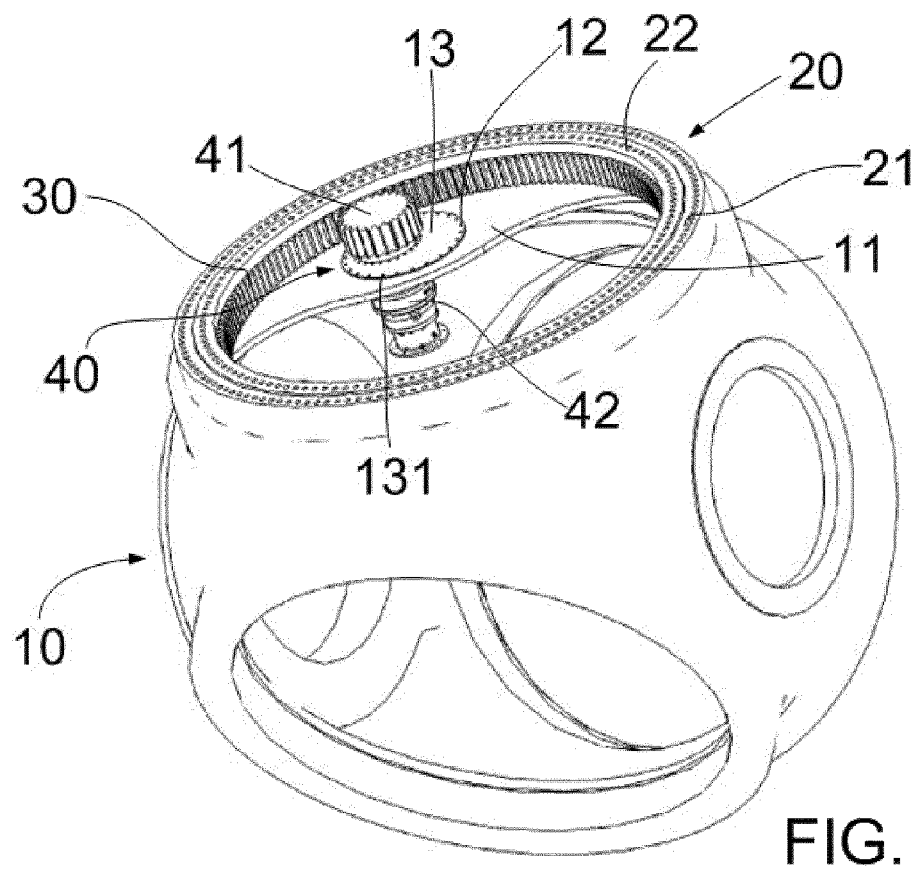
FIG. 1 shows a perspective view of a wind turbine rotor according to a first embodiment.
Figure 2:
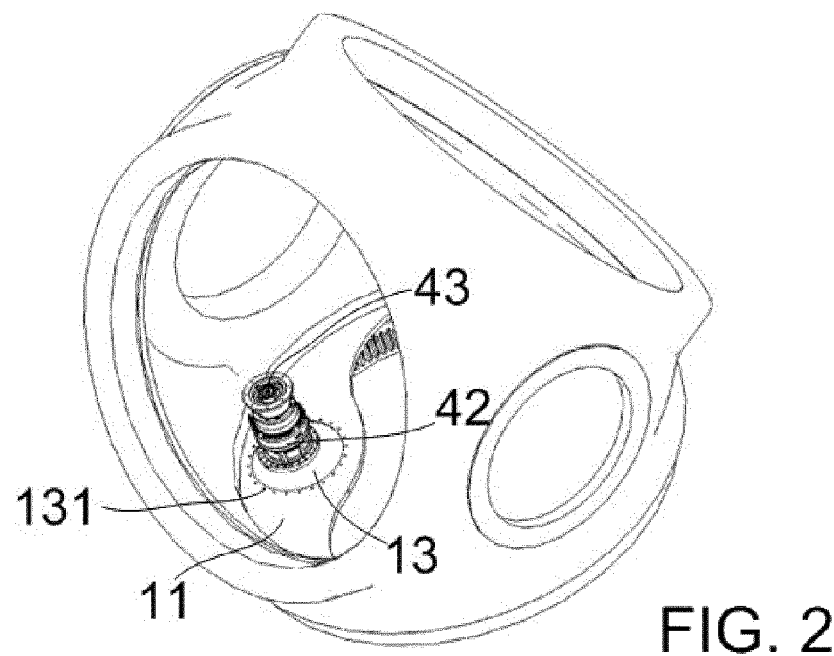
FIG. 2 shows a bottom view of the perspective of FIG. 1.

FIGS. 1 and 2 show a wind turbine rotor according to a first embodiment. FIG. 1 shows a perspective view and FIG. 2 shows a bottom view of said perspective. The rotor may comprise a hub 10 to which a plurality of blades (not shown) may be rotatably attached. Pitch systems may be provided for rotating each of the blades substantially along its longitudinal axis. A pitch system may comprise a pitch bearing 20, a gear 30 and a pitch drive 40. The bearing 20 may comprise an outer bearing ring 21 connected with the hub 10 and an inner bearing ring 22 connected with a blade (not shown). It should be noted, that in other implementations the blades could be attached either at the outer or at the inner bearing ring and the hub would be attached to the other of the outer or inner bearing ring.

According to FIG. 1, the pitch drive 40 may comprise a drive pinion 41 which meshes with the gear 30, a pitch motor (see FIG. 2) and a reductor gearing 42. The hub 10 may comprise a flange 11 for mounting the pitch drive 40 and the gear 30 may be provided in the inner bearing ring 22. In other embodiments, the blade may comprise the flange for mounting the pitch drive and the hub may comprise the gear.

According to the embodiment shown in FIG. 1, the flange 11 may be provided with a round hole 12. An intermediate disc 13 may be concentrically arranged with respect to the round hole 12. The intermediate disc 13 may completely cover the hole 12. Thus, the robustness and stiffness of the assembly flange-intermediate disc may be substantially unaffected by the presence of the hole. The intermediate disc 13 may further comprise an off-center opening with respect to a central axis of the hole (see FIG. 4). The pitch drive 40 may be mounted on the flange 11 through the off-center opening of the intermediate disc 13. This way, a rotation of the intermediate disc 13 around the central axis of the hole, results in an eccentric movement (rotation) of the pitch drive around the intermediate disc rotational axis. In alternative embodiments, the hole provided in the flange and the intermediate support may have other shapes than circular.

FIG. 1 shows a situation in which the blade may be in the pitch position at or below nominal wind speed. The intermediate disc 13 may be arranged in a position in which the drive pinion 41 can mesh with a first gear section (see FIG. 3a). FIG. 2 shows a bottom view of FIG. 1, wherein the pitch drive mounted on the flange 11 through the off-center opening is shown from the bottom and the pitch motor 43 and the reductor gearing 42 are clearly shown.

Figure 3A:
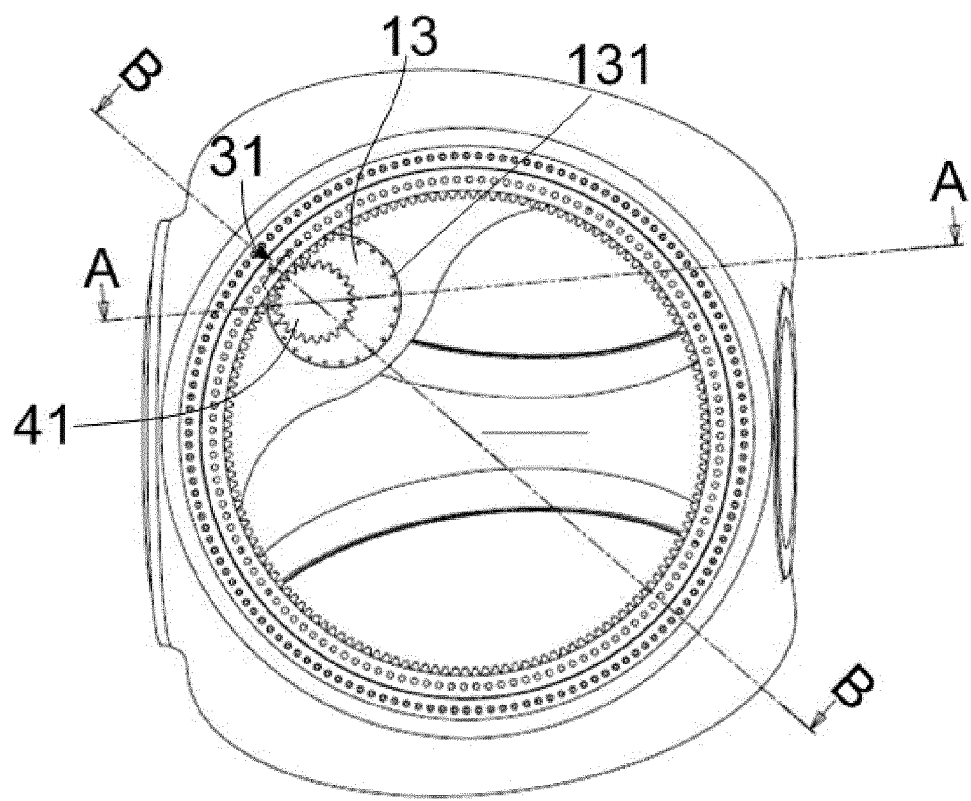
FIGS. 3a and 3b show top views of the two different positions of the intermediate support according to an embodiment.
Figure 3B:
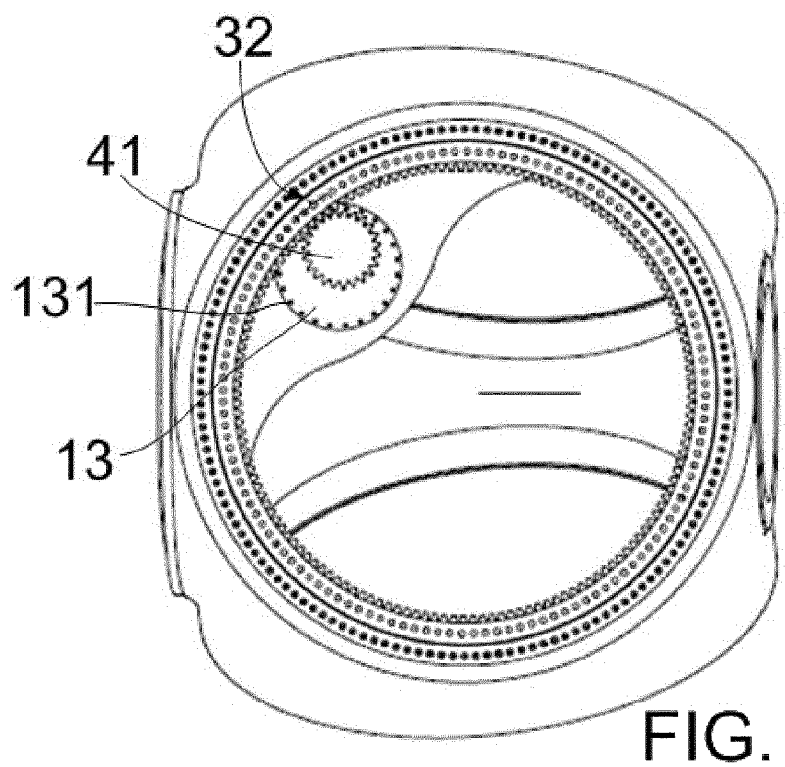

FIGS. 3a and 3b each show a top view of the wind turbine rotor wherein the intermediate disc 13 is arranged in the round hole 12 of the flange 11 in respectively a first and a second position in which the drive pinion 41 can mesh with respectively a first and a second different gear sections 31 and 32. These first and second gear sections 31 and 32 may be displaced e.g. a couple of teeth. Thus, for the same pitch position of the blade, different teeth of the gear are in contact with the pinion. Notably, in the default pitch position, for wind speeds at or below nominal wind speed, the section of the gear in contact with the pinion may thus be changed. As such, the wear may be spread between various teeth.

The separation in between the first and second gear sections 31, 32 that mesh with the drive pinion 41 may be increased or decreased by varying the eccentricity of the opening provided in the intermediate disc 13. If a very large distance between both gear sections is required and the maximum eccentricity of the off-center opening of the intermediate disc is not enough, then the size of the hole and the intermediate disc could also be increased. This measure would also be available in those cases in which the hole and the intermediate support have a not circular shape.

FIGS. 1-3b further show that the intermediate disc 13 may be fixed to the flange 11 by screws or bolts 131 arranged around the perimeter of the intermediate disc 13. Optionally, a homogeneous distribution of screws or bolts around the perimeter is used in order to achieve a strong and resistant flange-intermediate disc assembly. In some embodiments, the screws or bolts may be arranged with their heads on the pinion side, thus screwing and unscrewing may be further facilitated.

In some embodiments, the screws or bolts may be arranged in predefined screw or bolt positions such that the intermediate piece can be fixed only in a first and a second position in which the drive pinion meshes with a first and a second gear section. These embodiments may require previous calculations, but may simplify maintenance works involving movement of the intermediate support. The predefined screw or bolt positions may be the same for the first and second positions of the intermediate support described in FIGS. 3a and 3b or they may be different. This way, no errors occur when moving from one position of the intermediate support to the other. Other possibilities for fixing the intermediate support in the hole of the flange may also be suitable as long as they permit the intermediate support to be unfixed from the flange, moved around a central axis of the hole and re-fixed to the flange.

FIGS. 4 and 5 each show a cross-sectional view of FIG. 3a. FIG. 4 shows a cross-sectional view along the eccentricity plane, i.e. the plane defined by the drive pinion axis 411 and the intermediate disc rotational axis 132 which coincides with the central axis of the hole. FIG. 5 shows a cross-sectional view along the plane defined by the drive pinion axis 411 and the gear axis 33. An enlarged view of the area enclosed by the dashed lines of FIG. 5 shows that matching holes 133, 111 may be provided in the intermediate disc 13 and in the flange 11 respectively for housing the bolts or screws for the mechanical mesh between these two pieces (the screws/bolts are not shown). Furthermore, FIGS. 4 and 5 show that two rows of rolling elements 20a, 20b may be arranged between the inner 22 and outer 21 bearing rings and may allow both bearing rings to rotate relative to each other.

In some embodiments, the flange for mounting the pitch drive may form an integral piece with the hub or the blade. In others, it may be a separate piece fixed to the hub or blade by welding or by fastening means such as screws, bolts or similar. In yet further embodiments, more than one flange may be provided, e.g. a pair of flanges arranged either next to or in front of each other.

In these cases, wherein more than one flange is provided, it is further possible to provide each flange with a hole. Furthermore, an intermediate support comprising an off-center opening substantially as hereinbefore described may be arranged on each hole. Thus the position in which the pinion meshes with the gear may further be changed by moving the pitch drive from the first flange to the second flange. Hence, according to what was explained before for each flange there will be two positions of the intermediate support in which the drive pinion meshes with a different gear section, thus, it will be possible to obtain four positions in which the drive pinion meshes with four different gear sections.

In alternative embodiments, the gear may be provided on a ring of the bearing. In some embodiments, the gear may be an annular gear and may extend along substantially the whole inner or outer circumference of the inner or outer bearing ring (360 degrees). In others, it may extend along only a portion of an inner or outer circumference of the inner or outer bearing ring (e.g. approx. 90-100 degrees). In yet further embodiments, the gear may be made from a plurality of annular segments.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A wind turbine rotor comprising a hub, a plurality of blades and at least one pitch system for rotating a blade substantially along its longitudinal axis,
   wherein the pitch system comprises a bearing, a gear and a pitch drive, the pitch drive being arranged on a flange and having a motor and a pinion which meshes with the gear, wherein one of the hub and blade comprises the flange and the other of the hub and blade comprises the gear, and
   wherein the flange is provided with a hole and an intermediate support is concentrically arranged with respect to the hole, wherein the intermediate support comprises an off-center opening with respect to a central axis of the hole and the pitch drive is mounted through the off-center opening, and wherein the position of the off-center opening is such that the intermediate support can be arranged in a first position in which the drive pinion meshes with a first section of the gear and in a second position in which the drive pinion meshes with a second section of the gear.

2. The wind turbine rotor of claim 1, wherein the intermediate support is fixed to the flange by screws or bolts being arranged around a perimeter of the intermediate support.

3. The wind turbine rotor of claim 2, wherein the screws or bolts fixing the intermediate support to the flange are arranged in predefined screw or bolt positions such that the intermediate support can be fixed only in the first and second positions in which the drive pinion meshes with the first and second gear sections.

4. The wind turbine rotor of claim 3, wherein the predefined screw or bolts positions are the same for each of the first and second positions of the intermediate support.

5. The wind turbine rotor of claim 3, wherein the predefined screw or bolts positions are different for each of the first and second positions of the intermediate support.

6. The wind turbine rotor of claim 1, wherein the drive pinion is mounted on a reductor gearing of the pitch system, the reductor gearing being fixed to the intermediate support by screws or bolts.

7. The wind turbine rotor of claim 1, wherein the intermediate support is a plate.

8. The wind turbine rotor of claim 7, wherein the hole of the flange is a round hole and the intermediate support is a disc.

9. The wind turbine rotor of claim 1, wherein the gear is provided on a ring of the bearing.

10. The wind turbine rotor of claim 9, wherein the gear extends along substantially the whole inner or outer circumference of an inner or outer bearing ring.

11. The wind turbine rotor of claim 9, wherein the gear extends along only a portion of an inner or outer circumference of an inner or outer bearing ring.

12. The wind turbine rotor of claim 1, wherein the gear is made from a plurality of annular segments.

13. The wind turbine comprising a wind turbine rotor according to claim 1.

14. The wind turbine of claim 13, wherein the intermediate support is fixed to the flange by screws or bolts being arranged around a perimeter of the intermediate support.

15. The wind turbine of claim 14, wherein the screws or bolts fixing the intermediate support to the flange are arranged in predefined screw or bolt positions such that the intermediate support can be fixed only in the first and second positions in which the drive pinion meshes with the first and second gear sections.

16. The wind turbine of claim 15, wherein the predefined screw or bolt positions are the same for each of the first and second positions of the intermediate support.

17. The wind turbine of claim 15, wherein the predefined screw or bolt positions are different for each of the first and second positions of the intermediate support.

18. The wind turbine of claim 13, wherein the intermediate support is a plate.

19. The wind turbine of claim 18, wherein the hole of the flange is a round hole and the intermediate support is a disc.

\* \* \* \* \*